US008171503B2

(12) United States Patent
Wakana

(10) Patent No.: US 8,171,503 B2
(45) Date of Patent: May 1, 2012

(54) IMAGE PROCESSING SYSTEM AND IMAGE PROCESSING METHOD IN WHICH A PLURALITY OF DEVICES COOPERATE TO PERFORM IMAGE PROCESSING, WHEREIN THE IMAGE PROCESSING SYSTEM AND IMAGE PROCESSING METHOD ARE CAPABLE OF DISPLAYING INFORMATION ON OPERATIONS TO BE PERFORMED BY THE DEVICES

(75) Inventor: Toru Wakana, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1057 days.

(21) Appl. No.: 11/864,083

(22) Filed: Sep. 28, 2007

(65) Prior Publication Data

US 2008/0155568 A1 Jun. 26, 2008

(30) Foreign Application Priority Data

Dec. 21, 2006 (JP) ................ 2006-344399

(51) Int. Cl.
G06F 9/44 (2006.01)
G06F 3/12 (2006.01)
(52) U.S. Cl. ....................... 719/321; 358/1.15
(58) Field of Classification Search .......... 719/310, 719/321; 718/104; 358/1.15
See application file for complete search history.

(56) References Cited

U.S. PATENT DOCUMENTS

| 5,790,797 | A | * | 8/1998 | Shimada et al. | 709/224 |
| 5,991,846 | A | * | 11/1999 | Ooki | 710/241 |
| 6,256,107 | B1 | * | 7/2001 | Toda | 358/1.15 |
| 2002/0116439 | A1 | | 8/2002 | Someshwar et al. | |
| 2005/0068547 | A1 | * | 3/2005 | Negishi et al. | 358/1.1 |
| 2005/0141006 | A1 | | 6/2005 | Aiyama | |
| 2005/0213144 | A1 | | 9/2005 | Uejo | |
| 2006/0044585 | A1 | | 3/2006 | Kaneko | |
| 2006/0146363 | A1 | * | 7/2006 | Choi et al. | 358/1.15 |
| 2006/0197977 | A1 | | 9/2006 | Miyata | |
| 2006/0232818 | A1 | | 10/2006 | Hino | |
| 2007/0177196 | A1 | * | 8/2007 | Maeda | 358/1.15 |

FOREIGN PATENT DOCUMENTS

| EP | 1717690 A2 | 11/2006 |
| JP | 10-336376 A | 12/1998 |
| JP | 2004-178202 A | 6/2004 |
| JP | 2004-310746 A | 11/2004 |
| JP | 2005-129011 A | 5/2005 |

OTHER PUBLICATIONS

U.S. Appl. No. 11/866,904, filed Oct. 3, 2007.

* cited by examiner

*Primary Examiner* — Van Nguyen
(74) *Attorney, Agent, or Firm* — Canon U.S.A., Inc. IP Division

(57) ABSTRACT

Image processing conditions that have been set are divided into a plurality of processes, and devices capable of executing the processes are searched for. Based on functions of devices that are found as a result of the search and the set image processing conditions, operation flows to be executed by the devices are assigned to the devices, and the assigned operation flows and the names of the corresponding devices are displayed. The operation flows are then executed. Thus, a desired output can be achieved by a plurality of devices that cooperate with each other.

9 Claims, 11 Drawing Sheets

|  | MFP 101 | MFP 102 | MFP 103 | MFP 104 | MFP 105 | MFP 106 |
|---|---|---|---|---|---|---|
| COLOR PRINTING | × | ○ | ○ | × | × | × |
| COPY | ○ | ○ | ○ | ○ | ○ | ○ |
| SAVE | ○ | ○ | ○ | ○ | ○ | ○ |
| PDL | ○ | × | ○ | × | ○ | × |
| FAX | × | × | × | ○ | × | ○ |
| SADDLE-STITCH BINDING | × | × | × | × | ○ | ○ |
| CASE BINDING | × | × | × | ○ | × | × |
| SHEET INSERTION | × | × | × | ○ | ○ | × |
| FUNCTION A | × | ○ | × | ○ | × | ○ |
| FUNCTION B | ○ | × | ○ | × | ○ | × |

FIG. 10

Device Name: MFP 2
IP Address: XXX.XXX.XXX.XXX
Saddle-stitch Binding: NA

FIG. 11

| SEARCH RESULTS | 1001 |
|---|---|
| SEARCH RESULT 1: ID0001 MFP102+MFP105 | |
| SEARCH RESULT 2: ID0002 MFP103+MFP105 | |
| | |
| | |
| | |

FIG. 18

MEMORY MAP OF STORAGE MEDIUM

STORAGE MEDIUM,
SUCH AS FD/CD-ROM

| DIRECTORY INFORMATION |
|---|
| FIRST DATA PROCESSING PROGRAM PROGRAM CODE GROUP CORRESPONDING TO STEPS OF FLOWCHART OF FIG. 7 |
| |

IMAGE PROCESSING SYSTEM AND IMAGE PROCESSING METHOD IN WHICH A PLURALITY OF DEVICES COOPERATE TO PERFORM IMAGE PROCESSING, WHEREIN THE IMAGE PROCESSING SYSTEM AND IMAGE PROCESSING METHOD ARE CAPABLE OF DISPLAYING INFORMATION ON OPERATIONS TO BE PERFORMED BY THE DEVICES

BACKGROUND OF THE INVENTION

1. Field of the Invention

The present invention relates to an image processing system in which a plurality of network-connected devices cooperate to perform image processing and to a processing method for use in the image processing system.

2. Description of the Related Art

Multifunction peripherals (MFPs) providing various functions as well as copying and printing have been available.

Some MFPs have various finishing functions. Such MFPs having various finishing functions are capable of performing various types of printing. In an environment in which a plurality of MFPs having different functions are network-connected, the plurality of MFPs are capable of cooperating with each other to share all the functions.

For example, in a case where a user desires FAX transmission to be performed, when an MFP not having a FAX function reads an original document, the MFP transfers the read data to an MFP having a FAX function so that the MFP having the FAX function can perform FAX transmission.

In a case where the user desires binding and printing to be performed, when an MFP not having a binding function reads an original document, the MFP transfers the read data to an MFP having a binding function so that the MFP having the binding function can perform binding and printing.

As described in, for example, Japanese Patent Laid-Open No. 2004-310746, a system for managing processes to be performed by a plurality of devices is available.

In the system described in Japanese Patent Laid-Open No. 2004-310746, in order to classify processes executed in a print-on-demand (POD) system and to conduct optimal scheduling for each of the processes so that efficient process management can be performed, a print job and a print instruction are received by an order-receiving/document-receiving manager. Then, a plurality of processes for the print job are controlled by an original document editing manager, a proof manager, a print manager, a post-processing manager, and the like, and the scheduling of each of the processes is conducted by a process management manager. Then, each of the processes is controlled on the basis of a scheduling result.

In recent years, there has been a growing demand to easily obtain a printed document that can be created by the above-mentioned POD system.

For example, there has been a demand to create a printed document by using a plurality of functions, such as color printing, gluing, and cover making. Certain print modes cannot be supported by using the combined functions of only one MFP. In order to meet such a demand, MFPs having the above-mentioned functions may be combined together. However, in this case, complicated user operations and complicated operation processes are required. In addition, it is difficult for a user to understand a function provided in each of the MFPs in order to perform a series of operations.

That is, when a plurality of devices are used in a cooperative manner to perform processing in the system described in Japanese Patent Laid-Open No. 2004-310746, a desired cooperative operation cannot be achieved and the convenience is reduced unless a user knows in advance which devices are to perform required operations and the order in which processes are to be executed.

SUMMARY OF THE INVENTION

It is desirable to provide an image processing system that solves some or all of the above-mentioned drawbacks and a processing method for use in the image processing system. It is also desirable to provide a mechanism for easily achieving cooperation of a plurality of devices and for executing operations in accordance with operation flows assigned to the plurality of devices.

According to an aspect of the present invention, an image processing system in which a plurality of network-connected devices perform image processing, the image processing system comprising a setting unit configured to set image processing conditions, a first search unit configured to search for a plurality of devices that meet the image processing devices set by the setting unit, an assigning unit configured to assign, based on functions of the plurality of devices found by the first search unit and the image processing conditions, operation flows to the plurality of devices, a flow display unit configured to display the operation flows assigned to corresponding devices by the assigning unit and names of devices to cooperate with the corresponding devices on a display, and an execution unit configured to execute the operation flows assigned to the corresponding devices.

Further features of the present invention will become apparent from the following description of exemplary embodiments with reference to the attached drawings.

BRIEF DESCRIPTION OF THE DRAWINGS

FIG. 10 shows an example of information transmitted from an MFP shown in FIG. 1 to another MFP.

FIG. 11 shows an example of a screen displayed on the UI screen shown in FIG. 6.

FIG. 18 illustrates a memory map of a storage medium storing various data processing programs that can be read by devices constituting an image processing system according to an embodiment of the present invention.

DESCRIPTION OF THE EMBODIMENTS

An exemplary embodiment of the present invention will be described with reference to the drawings.

System Configuration

Figures 1, 2:
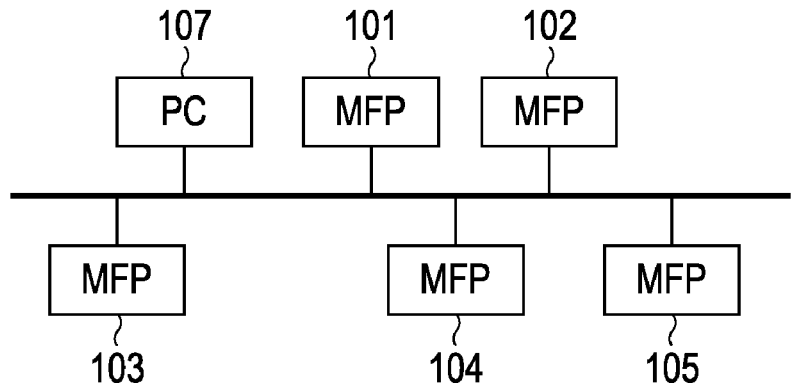
FIG. 1 is a block diagram showing a configuration of an image processing system according to a first embodiment of the present invention.
FIG. 2 illustrates a list of functions of MFPs in the image processing system shown in FIG. 1.

FIG. 1 is a block diagram showing a configuration of an image processing system according to an embodiment of the present invention. In this embodiment, an example in which a plurality of multifunction peripherals (MFPs) and a host personal computer (PC) or the like are network-connected to each other so as to communicate with each other and the plurality of MFPs cooperate to obtain a result of saddle-stitch binding and printing will be described. The number of cooperative devices may be two. Alternatively, the number of cooperative devices may be three or more. Hereinafter, a plurality of MFPs capable of cooperating with each other are collectively referred to as a print system.

Referring to FIG. 1, MFPs 101 to 105 are used in this print system. The MFPs 101 to 105 have different functions. FIG. 2 shows functions provided in the MFPs 101 to 105.

An external device 107, such as a host PC, creates document data using application software or the like and creates print data using a printer driver or the like. The external device 107 includes a controller unit including a central processing unit (CPU), a read-only memory (ROM), a random-access memory (RAM), and a network controller. In addition, an operating system (OS) is installed on a hard disk or the like. The CPU of the external device 107 performs particular data processing by loading the OS to the RAM and executing various types of application software. The particular data processing includes document creation, image editing, printing processing, binding processing, and the like. The external device 107 may be a general-purpose personal computer.

FIG. 2 shows a list of functions provided in the MFPs in the image processing system shown in FIG. 1. In FIG. 2, functions attained by the MFPs are described on the vertical axis, and names of the MFPs are described on the horizontal axis. In FIG. 2, a circle symbol provided in a cell indicates that an MFP has a corresponding function, a cross symbol provided in a cell indicates that an MFP does not have a corresponding function.

The functions described below are provided on the vertical axis of FIG. 2.

"Color printing" indicates whether an MFP has a color-printing function.

"COPY" indicates whether an MFP has a COPY function (a function of reading an image with a scanner of the MFP and printing the read image with a printer of the MFP).

"SAVE" indicates whether an MFP has a function of saving image data.

"PDL" indicates whether an MFP has a page description language (PDL) print function based on a PDL, such as PS (PostScript®) or LBP image processing system (LIPS®).

"FAX" indicates whether an MFP has a FAX function.

"Saddle-stitch binding" indicates whether an MFP has a saddle-stitch binding function.

Figure 3:
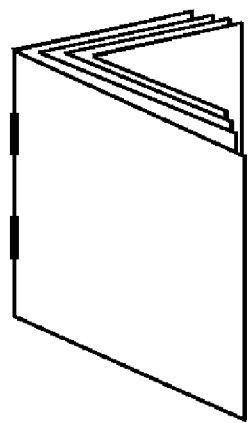
FIG. 3 schematically shows an example of saddle-stitch binding performed by an MFP shown in FIG. 1.

The "saddle-stitch binding" is a binding method shown in FIG. 3. In the saddle-stitch binding, all the sheets having the same size are stacked and folded in half, and the folded sheets are stapled at the crease. FIG. 3 schematically shows an example of a result of saddle-stitch binding performed by the MFP 105 or the MFP 106 shown in FIG. 1.

Figure 4:
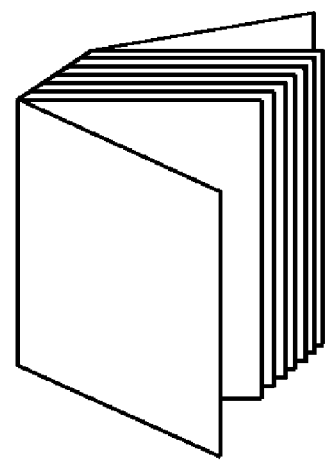
FIG. 4 schematically shows an example of case binding performed by an MFP shown in FIG. 1.

"Case binding" indicates whether an MFP has a case-binding function. The "case binding" is a binding method shown in FIG. 4. In the case binding, text sheets are wrapped with a cover sheet (the outermost sheet) and glue is applied to a portion corresponding to the spine. FIG. 4 schematically shows an example of a result of case binding performed by the MFP 104 shown in FIG. 1.

"Sheet insertion" indicates whether an MFP has a function of adding, using an inserter (see FIG. 5), a sheet not printed by the MFP to printed sheets.

Figure 5:
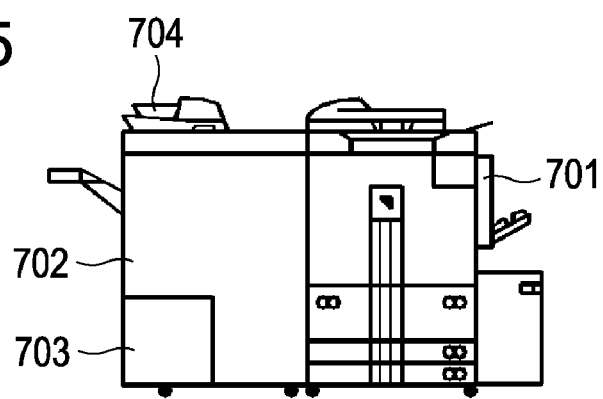
FIG. 5 shows the appearance of an MFP shown in FIG. 1.

FIG. 5 shows the appearance of an MFP (including a binding finisher). Referring to FIG. 5, reference numeral 701 denotes an MFP main unit, reference numeral 702 denotes a binding finisher connected to the MFP, reference numeral 703 denotes a paper output tray for outputting a binding result, and reference numeral 704 denotes an inserter.

The binding finisher 702 performs at least one of saddle-stitch binding and case binding. The inserter 704 is used for adding a sheet set in advance to sheets printed by the MFP main unit 701 so that binding for all the sheets can be performed. For example, case binding is performed by using a sheet supplied from the inserter 704 as a cover sheet and using sheets printed by the MFP main unit 701 as text. Alternatively, saddle-stitch binding is performed by using a sheet supplied from the inserter 704 as the outermost sheet and using sheets printed by the MFP main unit 701 as text. Other various types of binding can also be performed.

Each of "Function A" and "function B" may be any function that can be executed by an MFP. Two or more types of functions may be provided.

The internal configuration of the external device 107 and an MFP will be described with reference to FIG. 6.

Figure 6:
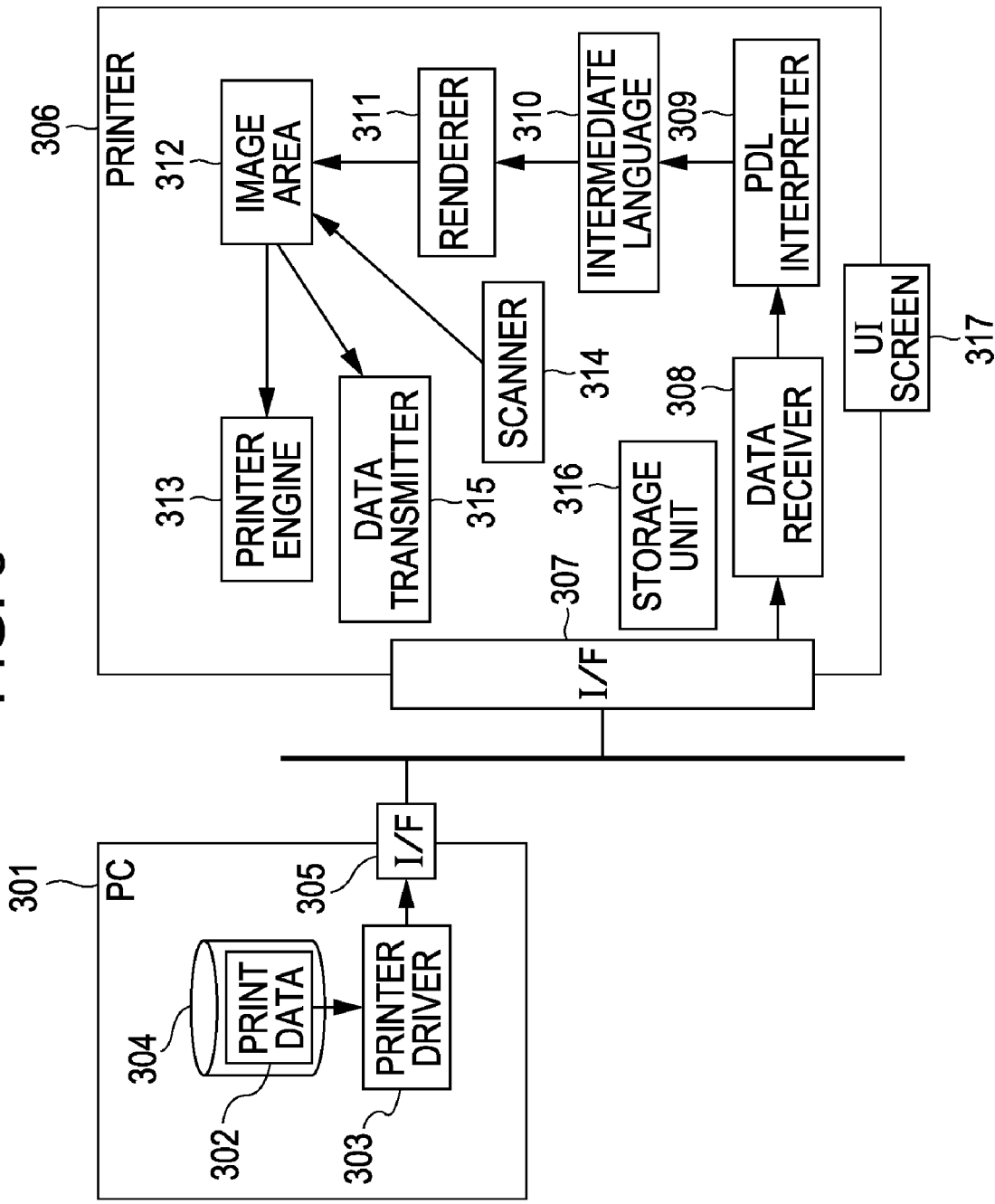
FIG. 6 is a block diagram showing a configuration of a host PC and an MFP according to an embodiment of the present invention.

Referring to FIG. 6, a host PC 301 is the same as the external device 107 shown in FIG. 1. Print data 302 is created using application software stored in the host PC 301. A printer driver 303 creates PDL data from the print data 302. The PDL data is data based on a page description language, such as PS, printer control language (PCL), or LIPS. A hard disk 304 stores the print data 302, the printer driver 303, application software for creating the print data 302, and the like. A communication interface 305 transmits PDL data created by the printer driver 303 to an MFP (printer) 306.

The MFP 306 is similar to each of the MFPs 101 to 105 shown in FIG. 1. One of the MFPs 101 to 105 is illustrated as a block diagram in FIG. 6.

A communication interface 307 receives PDL data and the like transmitted from the host PC 301. A data receiver 308 stores data received via the communication interface 307. A PDL interpreter 309 analyzes PDL data received by the data receiver 308. An intermediate language 310 is obtained when the PDL interpreter 309 analyzes PDL data received by the data receiver 308 and performs conversion of the PDL data. A renderer 311 analyzes the intermediate language 310 and converts the intermediate language 310 into image data. An image data storage unit (image area) 312 stores a processing result of the renderer 311. A printer engine 313 converts image data stored in the image area 312 into a video signal and performs printing. A scanner 314 reads an image in an original document and converts the image into image data. The image data is stored in the image area 312. A data transmitter 315 transfers image data stored in the image area 312 to an external device.

A storage unit 316 stores various types of information on the MFP 306. A user interface (UI) screen 317 is provided on the MFP 306. A user uses the UI screen 317 to perform various operations for the MFP 306 and the UI screen 317 displays information to be presented to the user.

The MFP 306 includes a controller unit including a CPU, a ROM, a RAM, and a network controller. With this configuration, an operation is controlled when a program stored in the ROM is loaded to the RAM and the CPU executes the program.

A process performed in this embodiment will be described with reference to the flowchart of FIG. 7.

In this embodiment, an example of processing when a plurality of MFPs cooperate to perform binding and printing is described. Steps S401 to S414 are carried out when the CPU of the controller unit of an MFP loads a control program to the RAM and executes the control program. The flowchart of FIG. 7 does not represent processing to be completed by a single MFP. The flowchart of FIG. 7 represents processing to be sequentially performed by different MFPs and operations to be performed by a user. That is, the flowchart represents processing to be performed by different MFPs and operations to be performed by the user in a series of operation processes.

In step S401, the user instructs the MFP 101 to execute device search on the network. In the device search, when the user inputs on the UI screen 317 finishing conditions for a document to be printed and gives a search instruction, MFPs that meet the finishing conditions are searched for. As described above, in this embodiment, the user is able to set, using the UI screen 317, as finishing conditions for a document to be printed, image processing conditions to be achieved by cooperation of a plurality of devices. Generally, the term "image processing conditions" as used herein includes not only finishing conditions (such as binding, saddle stitching, etc.) but also printing conditions (e.g. color copy) or any other condition (scan, fax, etc.).

An operation to be performed for device search will be described next with reference to FIGS. 8A and 8B.

Figure 8A:
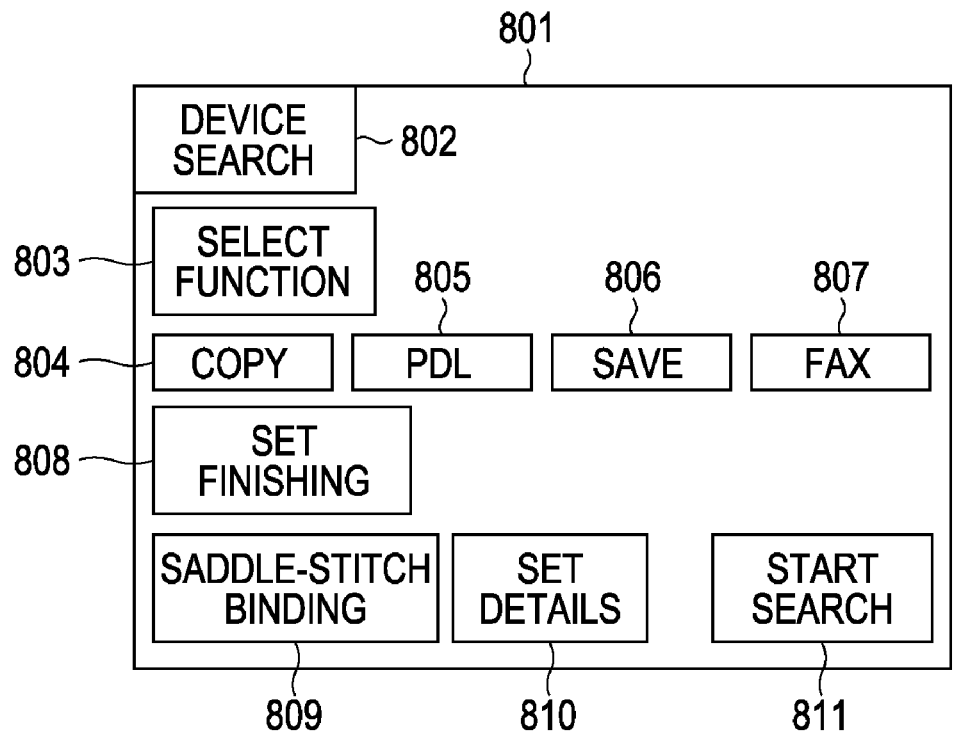
FIGS. 8A and 8B show examples of the detailed configuration of a UI screen of an MFP shown in FIG. 1.
Figure 8B:
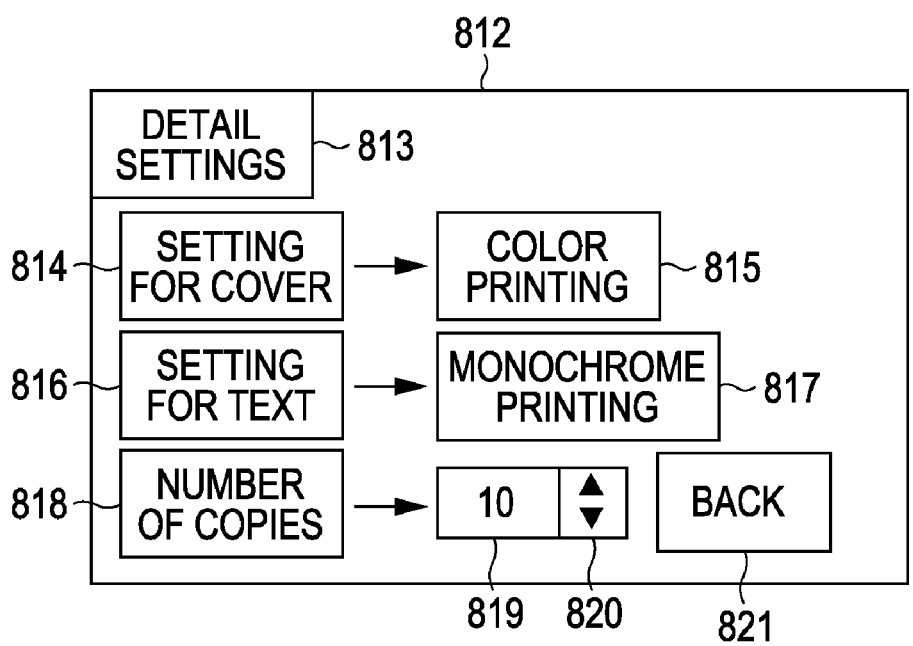

FIGS. 8A and 8B show detailed configurations of the UI screen 317 of the MFP 101. FIG. 8A shows a device search screen. FIG. 8B shows a detailed setting screen for saddle-stitch binding.

Referring to FIGS. 8A and 8B, reference numeral 801 denotes the entire UI screen. A tab 802 indicates an item selected on the UI screen. At the present time, the tab indicates an item "device search".

A button 803 is used for selecting a function. As selectable functions, COPY 804, PDL 805, SAVE 806, and FAX 807 are available. As the "save" function, image data acquired by reading an image in the original document with the scanner 314 of the MFP is stored in the image area 312. Alternatively, received PDL data converted into image data by the renderer 311 may be stored in the image area 312. The image data stored as described above can be printed when the user operates the UI screen 317 of the MFP.

A button 808 is used for setting finishing of a document to be printed. In FIGS. 8A and 8B, as finishing, saddle-stitch binding 809 is designated. A button 810 is used for setting details. When the saddle-stitch binding 809 is designated and the button 810 is pressed, a screen (a display screen 812 shown in FIG. 8B) for setting details of saddle-stitch binding is presented. Instead of saddle-stitch binding, case binding may be selected.

A tab 813 indicates an item selected on the UI screen. At the present time, the tab indicates an item "detail settings".

A button 814 is used for performing setting for a cover. In this example, color printing 815 is designated. A button 816 is used for performing setting for text. In this example, monochrome printing 817 is designated.

A button 818 is used for setting the number of copies of document to be printed. In this example, as the number of copies 819, "10" is designated. A button 820 is used for changing the number of copies. The number of copies can be increased or decreased. A button 821 is used for returning to the original UI screen (shown in FIG. 8A).

A button 811 is used for starting device search. When the button 811 is pressed, combination of devices providing a printed document that meets the conditions set as described above is searched for.

A method for performing device search will be described next.

The MFP 101 shown in FIG. 1 executes a search program stored in the storage unit 316 shown in FIG. 6, and queries the MFPs on the network shown in FIG. 1 as to their capabilities. The MFP 101 may broadcast search packets to the MFPs or may query an MFP or a server set in advance.

The capability of an MFP includes, for example, printing speed, presence or absence of a color-printing function, mounted options, and other functions relating to printing. Information on the capability is stored in the storage unit 316 shown in FIG. 6 of each of the MFPs shown in FIG. 1.

Figure 9:
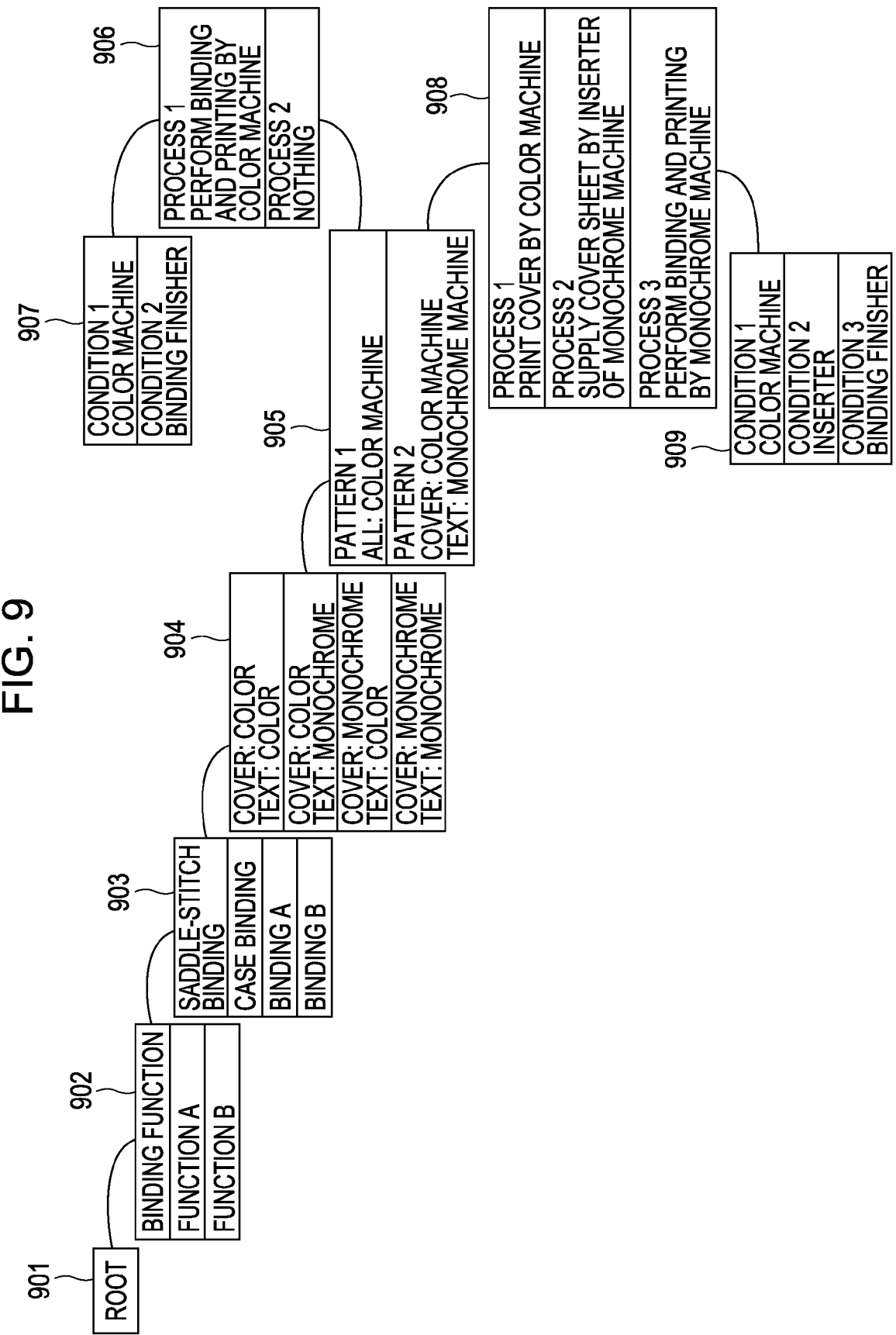
FIG. 9 illustrates an example of the data structure of an index stored in a storage unit shown in FIG. 6.

FIG. 9 shows an example of a data structure of an index stored in the storage unit 316 shown in FIG. 6. The index includes data for identifying search conditions used for searching for a plurality of devices that meet finishing conditions designated by the user.

Referring to FIG. 9, the data structure always starts from a root 901 of the index. Reference numeral 902 denotes a category indicating function classification. Printing conditions designated as shown in FIGS. 8A and 8B are obtained from the storage unit 316 shown in FIG. 6, and a corresponding category is selected. In this example, "binding and printing" is designated.

Reference numeral 903 denotes a category indicating the type of "binding and printing". Printing conditions designated on the screens shown in FIGS. 8A and 8B are obtained from the storage unit 316 shown in FIG. 6, and a corresponding category is selected. In this example, "saddle-stitch binding" is designated.

Reference numeral 904 denotes a category indicating a method for implementing "saddle-stitch binding". The printing conditions designated on the screens shown in FIGS. 8A and 8B are obtained from the storage unit 316 shown in FIG. 6, and a corresponding category is selected. In this example, "cover: color, text: monochrome" is designated.

Reference numeral 905 denotes a category indicating the type of "pattern of processing to be performed by MFP(s)", and patterns are added to conditions. In this example, since "cover: color, text: monochrome" is designated as the category 904, a first pattern PATTERN 1 in which the cover and text are printed by a color machine and a second pattern PATTERN 2 in which the cover is printed by a color machine and the text is printed by a monochrome machine are selected in combination. The user may select a pattern from among the combination of patterns in the category 905.

A case where "pattern 1" is selected as the category 905 will be described next.

Reference numeral 906 denotes processes performed by one or a plurality of MFPs when "pattern 1" is selected. Information identifying the processes 906 is registered in the storage unit 316 shown in FIG. 6. In this example, only "process 1: perform binding and printing by color machine" is registered, and no further process (process 2 etc.) is registered.

Reference numeral 907 denotes search conditions. Search conditions used for searching for devices capable of performing the processes 906 are stored in the storage unit 316 shown in FIG. 6. In this example, "condition 1: color machine" and "condition 2: machine including binding finisher" are registered.

A case where "pattern 2" is selected as the category 905 will be described next.

Reference numeral 908 denotes processes performed by MFPs when "pattern 2" is selected. Information identifying the processes 908 is registered in the storage unit 316 shown in FIG. 6. In this example, "process 1: print cover by color machine", "process 2: supply cover by inserter of monochrome machine", and "process 3: perform binding and printing by monochrome machine" are registered in the storage unit 316 shown in FIG. 6. These processes may be performed by different MFPs.

Reference numeral 909 denotes search conditions used for searching for devices capable of performing the processes 908. The search conditions 909 are registered in the storage unit 316 shown in FIG. 6. In this example, "condition 1: color machine", "condition 2: monochrome machine including inserter", and "condition 3: monochrome machine including binding finisher" are registered. An MFP that meets all the three conditions is not searched for. An MFP that meets any one of the three conditions is searched for.

Any one of the search conditions 907 and 909 or both the search conditions 907 and 909 are transmitted as a search packet on the network in step S401.

When an MFP on the network shown in FIG. 1 meets one of the search conditions, the MFP transmits the IP address of the MFP, the name of the MFP, and a capability that meets the corresponding search condition to the MFP 101.

FIG. 10 shows an example of information transmitted from the MFP 102 to the MFP 101 shown in FIG. 1. The MFP 101 stores the received information in the storage unit 316 shown in FIG. 6.

Figure 7:
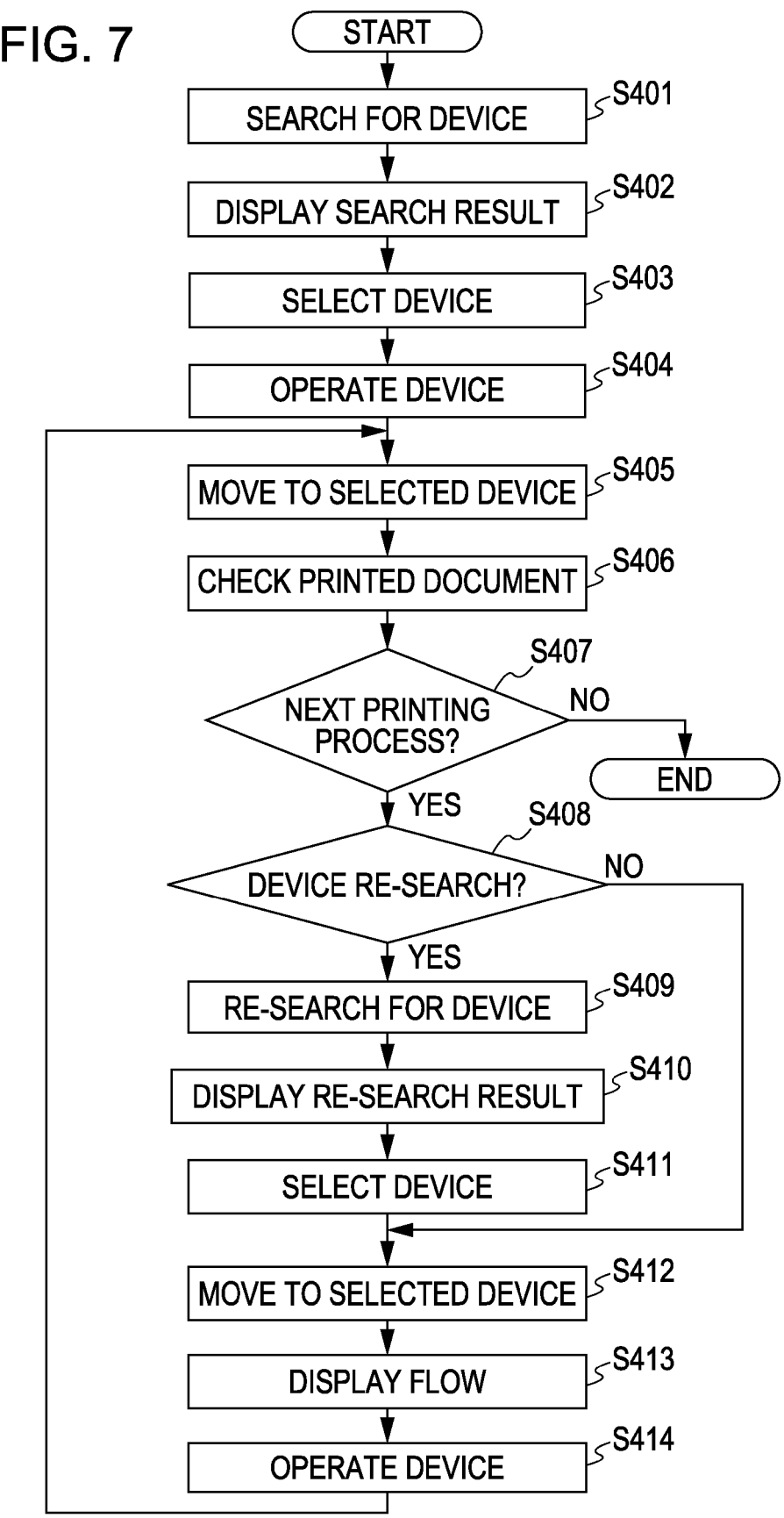
FIG. 7 is a flowchart of an example of a process performed by an image processing system according to an embodiment of the present invention.

In step S402 shown in FIG. 7, search results are displayed. In order to display the search results, the MFP 101 needs to analyze the results in step S402. An analysis method will be described next.

Results of the search performed under the conditions of "pattern 1" as the category 905 are analyzed. In this case, on the basis of the search conditions 907, a "device capable of color printing" and a "device capable of saddle-stitch binding" are searched for.

On the basis of the functions shown in FIG. 2, the MFPs 102 and 103 are found as MFPs capable of color printing, and the MFPs 105 and 106 are found as MFPs capable of saddle-stitch binding. However, when the found MFPs are analyzed by referring to the table shown in FIG. 2, MFPs that meet all the search conditions do not exist. That is, for the process designated as pattern 1 by the user, color printing and binding processing are performed by different devices.

Operation flows are assigned to the found devices on the basis of the above-mentioned finishing conditions. When the found MFPs are analyzed, the search conditions can be met by the use of the MFP 102 or 103 and the MFP 105 or 106.

Results of the search performed under the conditions of "pattern 2" as the category 905 are analyzed. In this case, on the basis of the search conditions 909, a "device capable of color printing", a "monochrome printer capable of saddle-stitch binding", and a "monochrome printer capable of inserting a cover" are searched for.

On the basis of the functions shown in FIG. 2, the MFPs 102 and 103 are found as MFPs capable of color printing. The MFPs 105 and 106 are found as MFPs capable of saddle-stitch binding, and the MFPs 104 and 105 are found as MFPs capable of inserting a cover.

Operation flows are assigned to the found devices on the basis of the above-mentioned finishing conditions. When the found MFPs are analyzed, the search conditions can be met by the use of the MFP 102 or 103 and the MFP 105.

Incidentally, in some cases, the search for devices may result in a single suitable device being found that is capable of carrying out all of the processes required.

FIG. 11 shows an example of a device-search-result display screen displayed on the UI screen 317 shown in FIG. 6. In this example, two search results are displayed, and search IDs "0001" and "0002" are assigned to the search results. In this example, pattern 2 is designated, and only search results based on pattern 2 are displayed. The processing of displaying the search results corresponds to the processing of step S402 shown in FIG. 7.

Figure 12:
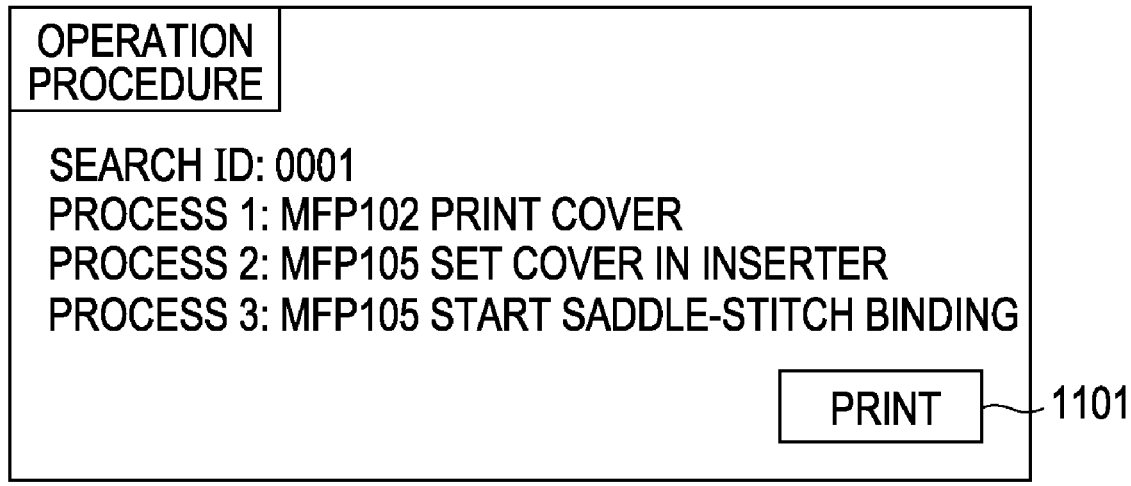
FIG. 12 shows an example of a screen displayed on the UI screen shown in FIG. 6.

When actual printing is performed on the basis of the search results, the user needs to operate a plurality of MFPs in a determined order and to instruct execution of printing in a determined order. Thus, in order to support user operations, an operation procedure is displayed on the UI screen 317. In this embodiment, when the user makes a selection in a search ID field 1001 shown in FIG. 11 on the UI screen 317, a screen shown in FIG. 12 is displayed on the UI screen 317 under the control of the controller unit of the MFP. When a search ID is designated, a device to be used is selected. This processing corresponds to processing of step S403 shown in FIG. 7.

FIG. 12 shows an example of a screen displayed on the UI screen 317 shown in FIG. 6 used for checking an operation procedure. In this embodiment, under the display control of the controller unit of the MFP, a list of the names of MFPs to which operation flows, that is, the processes 1 to 3, are assigned and the details of the processes 1 to 3 are displayed on the UI screen 317. Since the processes displayed as the list are presented in the order in which the processes are to be performed by corresponding MFPs in the course of the operation flow, the user is able to check which process is to be performed next and which MFP the user is to move to for the next process. Referring to FIG. 12, when the user presses a print button 1101, an operation process starts.

Then, in step S404, the user operates the MFP 101. In this embodiment, image data is stored in advance in the image area 312 of the MFP 101, and the user designates an image number at the start of the operation. The image data includes image data (color) for a cover and image data (monochrome) for text. The image data may be an image read with the scanner 314. Alternatively, the image data may be the print data 302 created by the host PC 301 and received via the printer driver 303.

Figure 13:
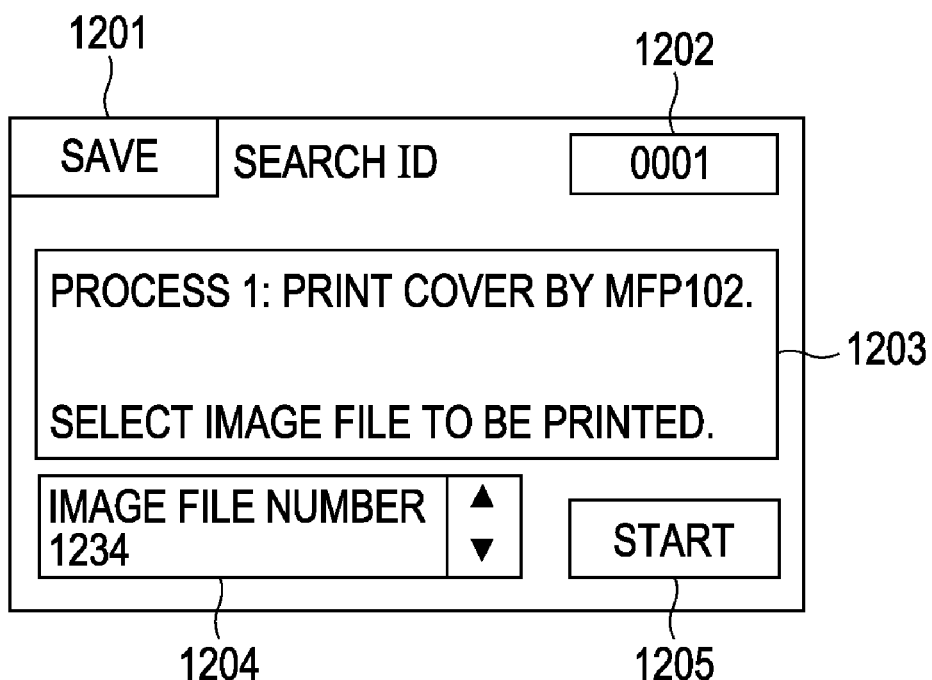
FIG. 13 shows an example of a screen displayed on the UI screen shown in FIG. 6.

FIG. 13 shows an example of a process-check display screen displayed on the UI screen 317 shown in FIG. 6. Referring to FIG. 13, reference numeral 1201 denotes a tab indicating a "save" function. At the present time, the "save" function is selected, and image data stored based on the save function is printed. Reference numeral 1202 denotes a search ID designated in step S403. Reference numeral 1203 denotes message corresponding to the search ID 1202. The user performs an operation while looking at the message.

Reference numeral 1204 denotes an image number stored in the image area 312. The user is able to select a desired image number. Reference numeral 1205 denotes a start button for starting processing. When the user presses the start button 1204, processing corresponding to a search ID of "0001" starts. In addition, when the user presses the start button 1204, image data of the cover as well as information on all the processes corresponding to the search ID is transferred from the MFP 101 to the MFP 102. At this time, the user is operating the MFP 101.

Then, in step S405, the user moves to the MFP 102 selected in step S403. Referring to FIG. 13, in accordance with the display indicating execution of printing by the MFP 102, the user is able to recognize that the user needs to move to the MFP 102. Of course, if it is not necessary for the user to move to a new MFP for the next process, no such move is performed.

In step S406, when the MFP 102 has already output a printed document, the user obtains the output print result (a cover sheet) from the paper output tray of the MFP 102, and checks the print result. When no printed document is output, the user waits for a printed document to be output.

Then, in step S407, the user checks whether the next process exists. Checking of whether the next process exists is performed by checking whether there is an unexecuted process in the processing of step S402 for displaying a search result. If it is determined in step S407 that there is an unexecuted process, processing of step S408 is performed. If it is determined in step S407 that there is no unexecuted process, processing is terminated. It is determined that there is no unexecuted process when all the processes in the search result selected in step S403 can be performed by a single MFP.

Figure 14:
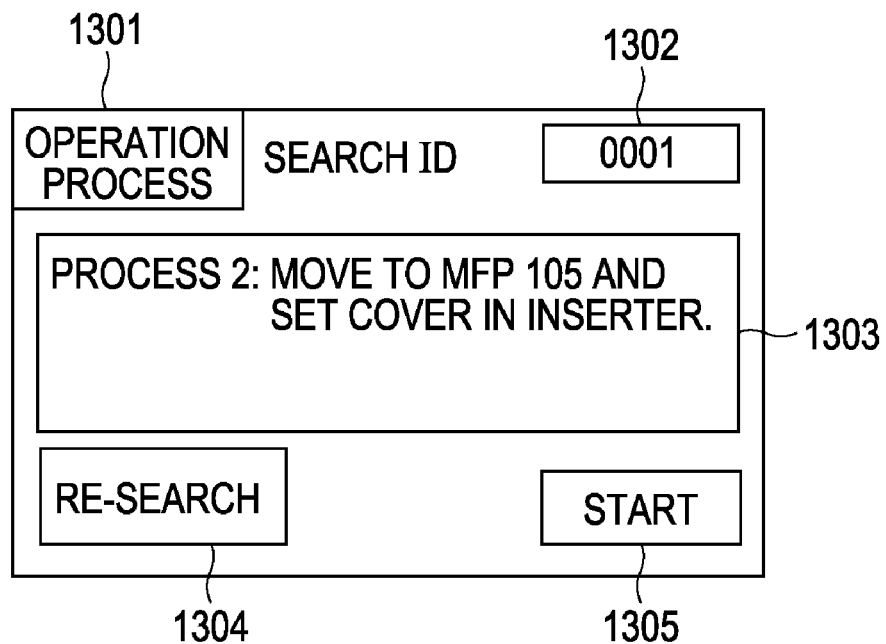
FIG. 14 shows an example of a screen displayed on the UI screen shown in FIG. 6.

If it is unclear whether there is an unexecuted process, the detail screen shown in FIG. 14 is displayed on the UI screen 317 of the MFP 102. The user is able to check whether there is an unexecuted process by entering an ID number displayed in step S402.

FIG. 14 shows an example of a detail-check screen displayed on the UI screen 317 shown in FIG. 6. With the screen shown in FIG. 14, the user is able to easily understand, in accordance with information presented on the screen, which process is to be performed next and which MFP the user is to move to for the next process (step S413). In this example, guidance information indicating "move to MFP 105 and set the cover sheet in the inserter" is displayed for the user so that the user can recognize the operation flow to be performed next.

Referring to FIG. 14, reference numeral 1301 denotes a tab indicating an "operation process screen" function. At the present time, a screen indicating an "operation process" is displayed. Reference numeral 1302 denotes a search ID. The search ID 1302 is identified by entering a search ID obtained in step S404 using a numeric keypad or the like or by displaying a list of received operation processes and selecting one of the received operation processes. Reference numeral 1303 denotes a message provided for the search ID 1302. The user performs an operation while looking at the message.

Reference numeral 1304 denotes a re-search button for designating execution of re-search for an MFP to be used in the next process. When the user presses the re-search button 1304, re-search is performed. Reference numeral 1305 denotes a start button for starting processing. When the user presses the start button 1305, the subsequent process in the search ID of "0001" starts (step S414). In addition, when the user presses the start button 1305, the MFP 102 requests the MFP 101 to transfer to the MFP 105 image data for text as well as an image number used in the process.

Then, in step S408, it is determined whether device re-search is to be performed. The device re-search is performed when the user wants to change the process subsequent to the already executed process. For example, for a search ID, when re-search is performed after process 1 is completed, re-search is performed for process 2 and the subsequent process. Search is performed for, from among the search conditions 909 (see FIG. 9), conditions 2 and 3, which correspond to process 2 and the subsequent process. Thus, a process based on the initial search result can be changed. If it is determined in step S408 that device re-search is to be performed, processing of step S409 is performed. If it is determined in step S408 that device re-search is not to be performed, processing of step S412 is performed.

Figure 15:
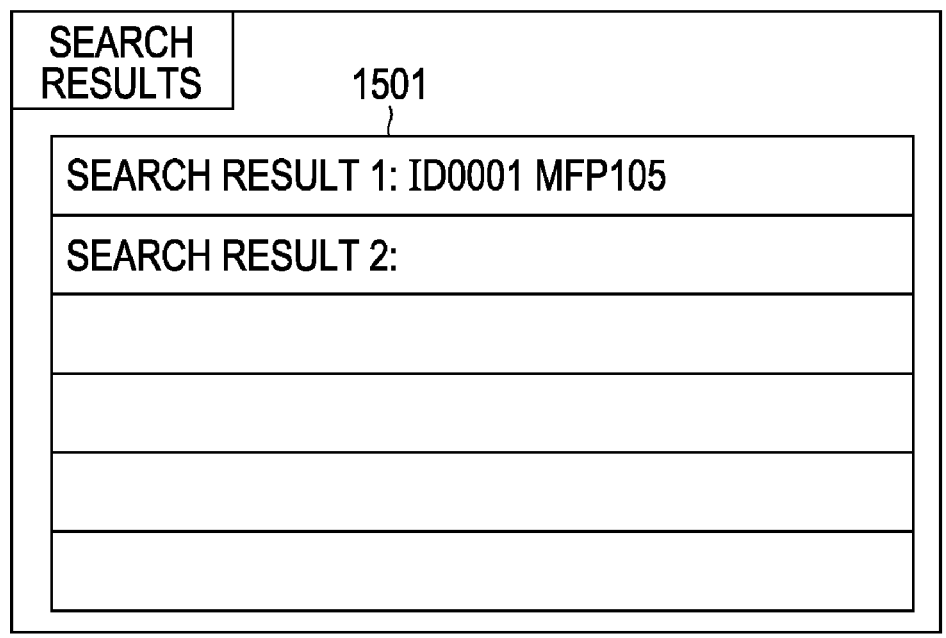
FIG. 15 shows an example of a screen displayed on the UI screen shown in FIG. 6.
Figure 16:
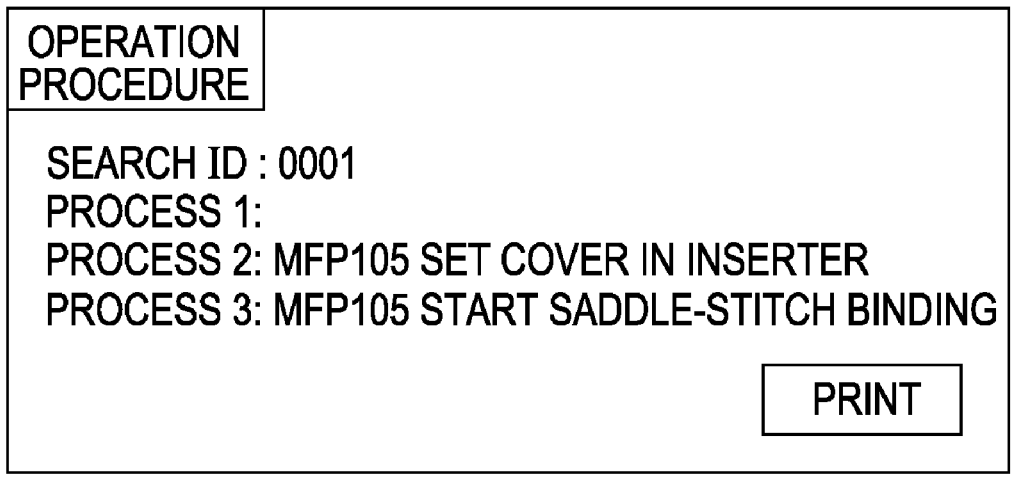
FIG. 16 shows an example of a screen displayed on the UI screen shown in FIG. 6.

Device re-search is performed in step S409, and results of the device re-search are displayed in step S410. As the results of the device re-search, a screen shown in FIG. 15 is displayed on the UI screen 317 of the MFP 102. When search result 1 is designated on the screen shown in FIG. 15, processes to be performed by the MFP 105 are displayed, as shown in FIG. 16, on the basis of the re-search result. Since a device to be used for process 2 and the subsequent process is selected by the processing for designating a search result, this processing corresponds to processing of step S411.

When the user presses the start button 1305, image data stored in the image area 312 of the MFP 101 is transmitted to the MFP 105 (step S414). The MFP 105 receives the image data at the data receiver 308 via the I/F unit 307, and stores the image data in the image area 312.

Then, processing of steps S405 to S414 is repeated until all the processes are completed.

That is, the user carries the printed document obtained in step S406 to an MFP that is to perform the next process, and sequentially performs operations. In this embodiment, the user carries to the MFP 105 the printed document (the cover sheet printed in color) obtained by the MFP 102 in the processing of step S406 in process 2. In step S413, the user enters a search ID, and a flow to perform the next process is displayed on the UI screen 317 of the MFP, as shown in FIG. 17.

Figure 17:
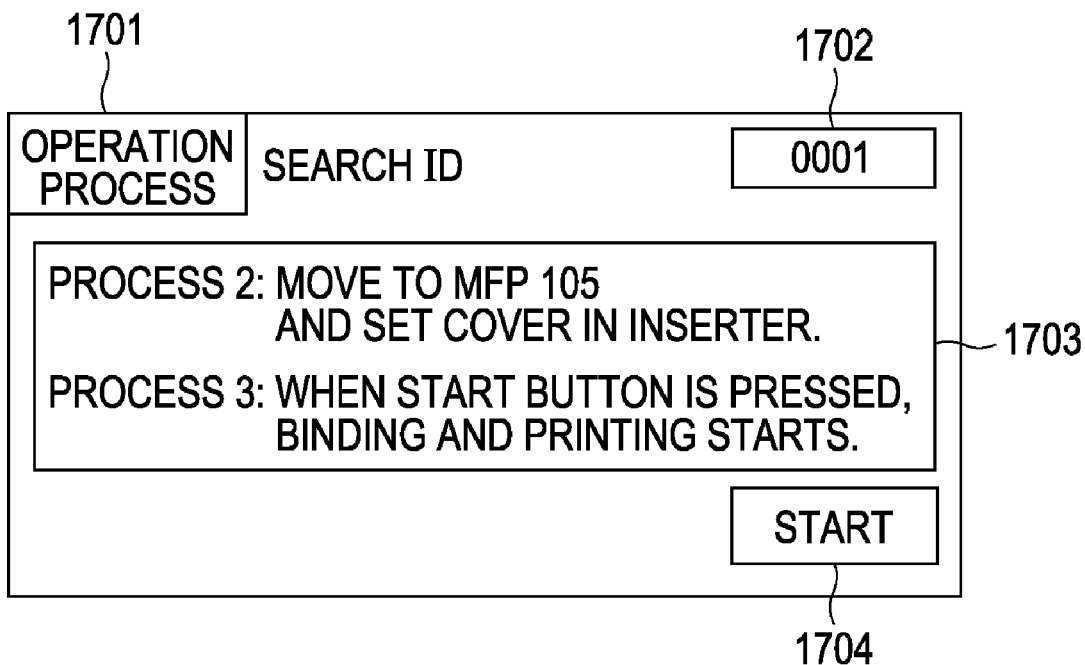
FIG. 17 shows an example of a screen displayed on the UI screen shown in FIG. 6.

When the user presses a start button 1704 shown in FIG. 17 of the MFP 102, the subsequent process based on the search ID of "0001" starts. That is, the MFP 102 requests the MFP 101 to transfer to the MFP 105 image data for text as well as an image number used in the process. Thus, the MFP 101 transfers the image data for text to the MFP 105 (step S414).

Then, the user moves to the MFP 105 (step S405), and repeats similar processing, and operates the MFP 105 so as to perform process 3 in step S414. That is, in this embodiment, the printed document (the cover sheet printed in color) obtained by the MFP 102 is set in the inserter 704 of the MFP 105.

Then, when the user operates the start button 1704 of the UI screen 317 of the MFP 105, the image data for text received from the MFP 101 and stored in the image area 312 is transmitted to the printer engine 313 and is printed on a designated sheet. Then, sheets are stacked on the binding finisher 702 connected to the MFP 105. Then, the cover sheet (printed by the MFP 102) set in advance is supplied from the inserter 704 of the MFP 105. Then, the cover sheet is added to the sheets stacked on the binding finisher 702, and the binding finisher 702 performs saddle-stitch binding.

Then, ten saddle-stitched copies are output to the paper output tray 703 of the binding finisher 702, as designated in FIG. 8. Then, the processing is terminated.

As described above, in this embodiment, when the user enters conditions of a print job using an MFP on the network, the print job under the conditions is divided into a plurality of processes and MFPs capable of performing the processes are searched for. Then, the found MFPs cooperate to perform the processes. The user is able to check the details of the processes. In addition, the user is able to check which process is to be performed and which MFP is to perform the process. As described above, the final print job result can be accurately acquired by using a plurality of MFPs. Since the user is able to control the cooperative execution of the processes while checking the status of the MFPs, user convenience is also improved.

Although a case where binding and printing is performed has been described in the above-described embodiment, other functions may be performed.

In addition, although image data is stored in an MFP and the image data stored in the MFP is selected in the above-described embodiment, an operation may be started from processing for setting an original document and reading the original document with a scanner. In addition, a cover sheet may be separately prepared.

In addition, although device search is performed by an MFP serving as an input source of an image in the above-described embodiment, the present invention is not limited to this. Device search may be performed using a PC. In this case, designation of image data to be used is added to search conditions. Thus, a device that is capable of inputting corresponding image data is searched for and a found device is added for an operation flow. In addition, cooperation of devices is not necessarily limited to printing. Other types of processing, such as transmission of image data, may be cooperatively performed.

A configuration of data processing programs that can be read by devices constituting an information processing system according to an embodiment of the present invention will be described with reference to a memory map shown in FIG. 18.

FIG. 18 illustrates a memory map of a storage medium storing various data processing programs that can be read by devices constituting an information processing system according to an embodiment of the present invention. Steps S401 to S404, S407 to S411, S413, and S414 of the processing of the flowchart of FIG. 7 are executed in accordance with the programs. Not all the steps are executed by a single device. The steps are executed by a plurality of devices in a distributed manner.

Although not particularly illustrated, in addition to information for managing a program group stored in the storage medium, such as version information and a creator, information that depends on an OS on a program reading side or the like, such as an icon that identifies the program, may be stored.

Furthermore, data depending on various programs is managed by the above-mentioned directory. In addition, a program for installing the various programs into a computer, a decompressing program for decompressing a compressed program to be installed, and the like may be stored.

The functions shown in FIG. 7 in the foregoing embodiments may be executed by a host computer in accordance with an externally installed program. In this case, the present invention is also applicable to a case where an information group including the program is supplied from a storage medium, such as a CD-ROM, a flash memory, or a floppy disk, or from an external storage medium via a network, to an output unit.

As described above, a storage medium on which program code of software for attaining the functions of the foregoing embodiments is recorded is supplied to a system or a device. Aspects of the present invention may be attained by reading and executing the program code stored in the storage medium by a computer (or a CPU or a microprocessing unit (MPU)) of the system or the device.

In this case, the program code itself read from the storage medium attains new functions of the foregoing embodiments, and the storage medium storing the program code constitutes the present invention.

Thus, any type of program, such as object code, a program to be executed by an interpreter, or script data to be supplied to the OS, may be used as long as it includes a function of a program.

The storage medium for supplying a program may be, for example, a floppy disk, a hard disk, an optical disk, a magneto-optical disk, an MO, a CD-ROM, a compact disc-recordable (CD-R), a compact disc-rewritable (CD-RW), a magnetic tape, a nonvolatile memory card, a ROM, a digital versatile disc (DVD), or the like.

In this case, the program code itself read from the storage medium attains the above-described functions of the foregoing embodiments, and the storage medium storing the program code constitutes the present invention.

In addition, the program may be supplied by connecting to a homepage on the Internet using a browser of a client computer and by downloading a computer program according to an aspect of the present invention or a compressed file having an automatic installation function from the homepage to a storage medium, such as a hard disk. In addition, the program may be supplied by dividing the program code constituting the program according to an aspect of the present invention into a plurality of files and by downloading the divided files from different homepages. That is, a World Wide Web (WWW) server, a file transfer protocol (FTP) server, and the like for allowing a plurality of users to download a program file for realizing function processing of an aspect of the present invention on a computer are also included in the claims of the present invention.

A program according to an aspect of the present invention may be encoded and stored in a storage medium, such as a CD-ROM, and may be distributed to users. Only a user who satisfies predetermined conditions may be able to download key information for decoding the encoded program from a homepage via the Internet. In addition, the encoded program can be executed by using the downloaded key information and can be installed to a computer.

In addition, the functions of the foregoing embodiments can be attained not only by executing the read program code by the computer but also by performing part or all of the actual processing by an OS or the like running on the computer on the basis of instructions of the program code.

Furthermore, the program code read from the storage medium may be written to a memory arranged in a function expansion board inserted into the computer or a function expansion unit connected to the computer. The functions of the foregoing embodiments can also be attained by performing part or all of the actual processing by the CPU or the like arranged in the function expansion board or the function expansion unit on the basis of instructions of the program code.

According to an aspect of the present invention, a plurality of devices that cooperate with each other to perform a series of operations can be controlled by simple operations. In addition, image processing that is cooperatively performed by a plurality of devices can be achieved conveniently and efficiently.

The present invention is not limited to the foregoing embodiments. Various changes including organic combinations of the foregoing embodiments may be made within the scope of the present invention. Such various modifications may also fall within the scope of the present invention.

Various examples and embodiments of the present invention have been explained. It should be understood by those skilled in the art that the spirit and scope of the present invention are not limited to a specific description of this specification.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-344399 filed Dec. 21, 2006, which is hereby incorporated by reference herein in its entirety.

What is claimed is:

1. An image processing system including an image processing apparatus, a first device, and a second device, and performing image processing in cooperation of the first device and the second device, the image processing system comprising:
   a setting unit configured to set image processing including a first process and a second process;
   a search unit configured to search the first device, which is capable of performing the first process included in the image processing set by the setting unit, and the second device, which is capable of performing the second process included in the image processing set by the setting unit;
   an assigning unit configured to assign the first process to the first device searched by the search unit and to assign the second process to the second device searched by the search unit;
   a first display control unit configured to display, on a display of the first device that performs the first process assigned by the assigning unit, information indicating an operation to be performed by a user for the second process that is performed after the first process; and
   a second display control unit configured to display information indicating an operation to be performed by a user for the second process that is to be performed by the second device but is not yet performed, on a display of the second device, before the second device performs the second process.

2. The image processing system according to claim 1, further comprising an instruction unit configured to instruct to perform the second process that is not yet performed, while the information indicating the operation to be performed by a user for the second process that is to be performed by the second device but is not yet performed is being displayed on the display of the second device.

3. The image processing system according to claim 1, wherein the first display control unit displays, on the display of the first device, information indicating operations to be performed by a user for remaining processing to be performed after the first process, the operations being displayed in an order in which operations are to be performed by a user.

4. The image processing system according to claim 1, wherein the second display control unit displays, on the display of the second device, information indicating operations to be performed by a user for remaining processing to be performed after the first process, the operations being displayed in an order in which operations are to be performed by a user.

5. The image processing system according to claim 1, wherein the first display control unit displays information indicating an operation to be performed by a user for the second process that is performed after the first process, in accordance with input operation identification information.

6. The image processing system according to claim 1, wherein the second display control unit displays information indicating an operation to be performed by a user for the second process that is to be performed by the second device but is not yet performed, in accordance with input operation identification information.

7. The image processing system according to claim 1, further comprising a re-search unit configured to re-search a device that is capable of performing a process that is not yet completed among processes included in the image processing set by the setting unit.

8. A control method for an image processing system in which image processing is performed in cooperation of a first device and a second device, comprising:
   setting image processing including a first process and a second process;
   searching the first device, which is capable of performing the first process included in the set image processing, and the second device, which is capable of performing the second process included in the set image processing;
   assigning the first process to the searched first device and assigning the second process to the searched second device;
   displaying, on a display of the first device that performs the assigned first process, information indicating an operation to be performed by a user for the second process that is performed after the first process; and
   displaying information indicating an operation to be performed by a user for the second process that is to be performed by the second device but is not yet performed, on a display of the second device, before the second device performs the second process.

9. A non-transitory storage medium readable by a computer storing a computer-executable program, the computer-executable program comprising:
   setting image processing including a first process and a second process;
   searching the first device, which is capable of performing the first process included in the set image processing, and the second device, which is capable of performing the second process included in the set image processing;
   assigning the first process to the searched first device and assigning the second process to the searched second device;
   displaying, on a display of the first device that performs the assigned first process, information indicating an operation to be performed by a user for the second process that is performed after the first process; and
   displaying information indicating an operation to be performed by a user for the second process that is to be performed by the second device but is not yet performed, on a display of the second device, before the second device performs the second process.

* * * * *